Jan. 26, 1965   C. F. RAMSTEDT   3,167,048
TORPEDO AUTOPILOT SERVO
Filed Feb. 14, 1963
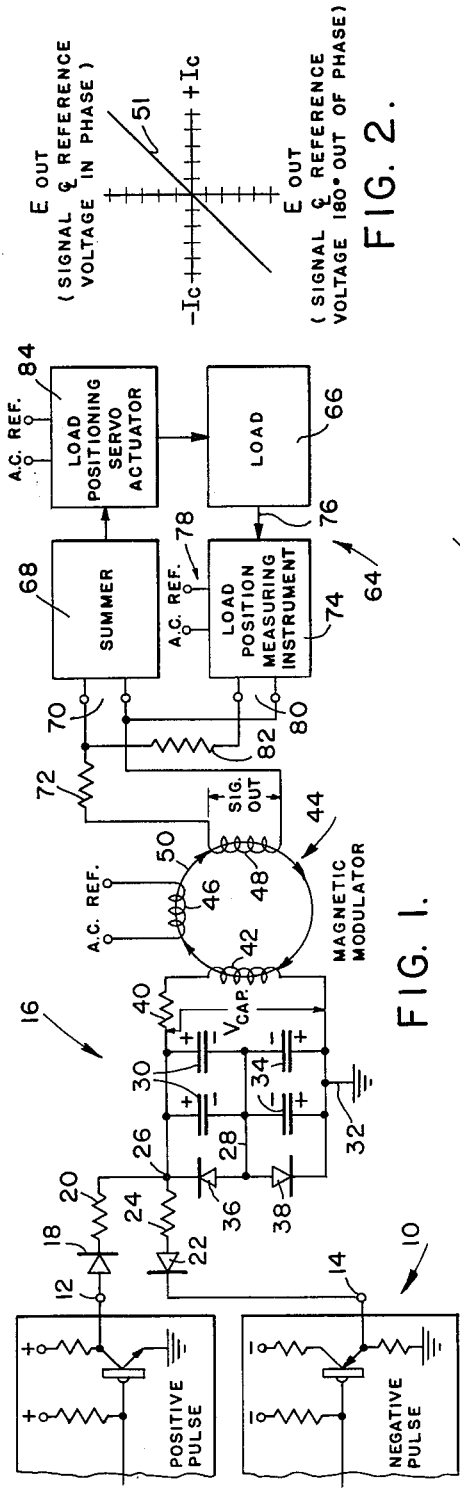
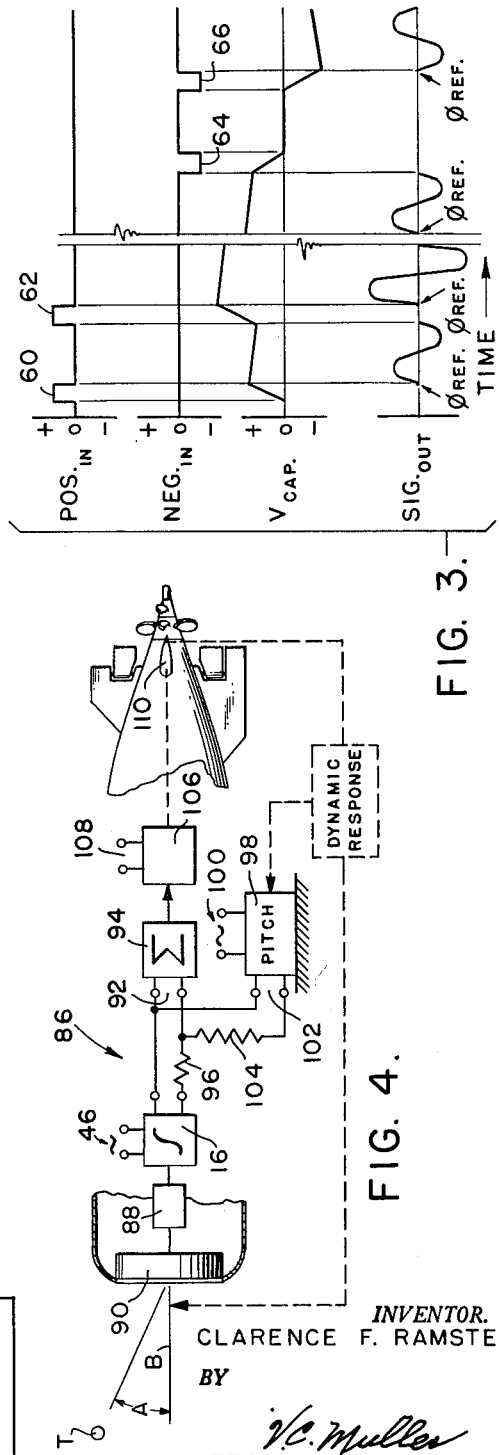
*INVENTOR.*
CLARENCE F. RAMSTEDT
BY
*V. C. Muller*
ATTORNEY.

3,167,048
TORPEDO AUTOPILOT SERVO
Clarence F. Ramstedt, Burlingame, Calif., assignor to the United States of America as represented by the Secretary of the Navy
Filed Feb. 14, 1963, Ser. No. 258,975
8 Claims. (Cl. 114—23)
(Granted under Title 35, U.S. Code (1952), sec. 266)

The invention described herein may be manufactured and used by or for the Government of the United States of America for governmental purposes without the payment of any royalties thereon or therefor.

The present invention relates to an integrator and D.C. to A.C. converter circuit for processing periodic D.C. pulses to provide an A.C. signal having an essentially pure and phase significant sine waveform in accordance with the integral of the pulses. The improvement of the present invention relates more particularly to an all-electronic circuit capable of operating at very low pulse repetition frequencies such as one pulse every several seconds, which are encountered in underwater echo-ranging systems. The invention also relates to servos generally and to closed loop auto-pilot systems.

Circuits of the type referred to are employed in the guidance control of acoustic homing torpedoes of the echo-ranging type. In such torpedoes, the basic electric guidance control signal is generated by echo-ranging apparatus which produces a periodic pulse signal having a pulse repetition frequency in the order of one pulse every several seconds, as determined by the time for a sound impulse and its returning echo to travel through water. The integrator and D.C. to A.C. converter circuit processes the pulse signal for application to torpedo steering circuits, which because of the availability of reliable A.C. components are usually of the A.C. type and therefore require an A.C. input. In addition to serving as a coupling between the echo-ranging apparatus and the steering circuits, the integrator and converter processes the basic pulse control signal by integrating it, and thereby provides a processed control signal which is free from high frequency noises and sudden spurious effects, and which somewhat lags the basic control signal in order to overcome tendencies toward oscillations within the high gain guidance control system.

The problems in providing an electronic circuit for pulse integration for low pulse repetition rates are well known. The ability of a conventional resistance-capacity integrating network to hold a charge over a period of several seconds depends principally upon employing sufficient magnitude of values of resistance and capacitance in the network. However, increases in magnitude of these components attenuate the network output, and it turns out that for low repetition rates such conventional networks are severely limited in providing useful outputs. Lacking a solution to this problem it has heretofore been considered necessary to integrate and convert the pulsed output of echo ranging apparatus by electromechanical apparatus, such as disclosed, among many others, in U.S. Patent 2,996,027, entitled "Acoustic Depth Torpedo," in which the pulses operated an electromagnetically controlled stepping switch providing a series of various amplitudes of A.C. signal at its contacts. Such electro-mechanical apparatus are somewhat unsatisfactory because they require some sort of boosting amplifier to sufficiently raise the power level of the signal circuits to operate the switch, and because of the inherent non-smoothness of such devices and their finite number of output levels.

Solution of this problem has been made more difficult because of the exacting and critical operational requirements of the steering circuits to which the output of the integrator and converter is applied. Such circuits are essentially closed-loop, feedback type power drives, commonly known as "servos." The servos have, in their input, a summing network which sums the A.C. output from the integrator and converter and an A.C. feedback signal which varies in accordance with the dynamic response of the controlled servo output. The phase of the feedback signal is adapted to be negative with respect to the integrator and converter output in order to obtain a difference or error signal at the output of the summing network, and this error signal is the basic electrical signal for actuating the power drive. It has been observed that any appreciable phase shift in the output of the integrator and converter relative to the reference A.C. supply, can cause an offset error in the controlled output of the servo, which if large enough could even cause uncontrolled fluctuations within the overall guidance control system.

The problems are further aggravated because of the necessity for ruggedness, reliability, and simplicity in design and operation inherent to components for weapons and complex control systems. Weapons are subject to rough handling and must be operable after prolonged periods of shelf storage. Failure of a single component in a complex control system can mean failure of the whole system. Also, in more recent torpedo designs there is a strict tactical requirement that the overall volume of the torpedo be minimized to facilitate delivery by helicopter and rocket propelled airframes such as the ASROC missile, Serial No. 15,769, filed March 17, 1960, which in turn requires compactness of assembly of internal equipment.

Accordingly, the objectives of the present invention include provision of:

(1) An improved integrator and D.C. to A.C. converter circuit for accurately integrating periodic pulses, capable of operating over a range of pulse repetition rates extending down to one pulse every several seconds;

(2) An integrator and D.C. to A.C. converter circuit for use with signal circuits having an output power level capable of driving an A.C. servo system;

(3) An integrator and D.C. to A.C. converter circuit having a high degree of fidelity of sinusoidal waveform and signal phase at its output;

(4) An all electronic integrator and D.C. to A.C. converter circuit having no mechanical or moving parts; and (5) An integrator and D.C. to A.C. converter circuit which is rugged, simple in design, and readily adapted for compactness in assembly.

Other objects and many of the attendant advantages of this invention will be readily appreciated as the same becomes better understood by reference to the following detailed description when considered in connection with the accompanying drawings wherein:

FIG. 1 is a schematic of a preferred form of circuit embodying the present invention illustrated in connection with a simple load positioning control circuit;

FIG. 2 is a plot showing the graphical relationship between the input and output of the magnetic modulator in the circuit of FIG. 1;

FIG. 3 illustrates waveforms taken at various points of the circuit of FIG. 1; and FIG. 4 is a schematic of a guidance control system of a torpedo which incorporates the circuit of FIG. 1.

Referring now to FIG. 1, a source of pulses 10 provides a periodic pulse signal consisting of either positive or negative pulses appearing alternatively at output 12 for positive pulses and at output 14 for negative pulses, respectively. The outputs 12 and 14 may consist of conventional voltage mode transistor pulse amplifiers.

Outputs 12 and 14 are connected to an integrator and D.C. to A.C. converter circuit 16. Output 12 is connected to a first input branch consisting of an isolating diode 18 connected to one end of a charge current limiting resistor 20, and output 14 is connected to a second branch consisting of an isolating diode 22 and a charge current limiting resistor 24. Diodes 18 and 22 are connected with their forward directions poled to pass only the corresponding positive and negative input pulses, respectively. The transistor pulse amplifiers in outputs 12 and 14 of pulse source 10 are of complementary types with their respective normal "off" voltage of appropriate polarity to back bias the isolating diodes in absence of a pulse, with the result that the diodes effectively isolate circuit 16 from pulse source 10 at all times except during a pulse. The other ends of the charge current limiting resistances are connected to a circuit point 26. Two or more polarized capacitors have their positive terminals connected to circuit point 26 and their negative terminals connected to a common conductor 28, forming a bank 30 of parallel capacitors. Forming another bank 34 of parallel capacitances are two or more like capacitors having their negative terminals connected to common conductor 28 and their positive terminals connected to a ground return 32 providing a common return to outputs 12 and 14. Capacitor banks 30 and 34 are effectively in series circuit with one another with their forward charge directions in opposite circuit directions. A pulse routing diode 36 is shunt connected across capacitor bank 30. The forward direction of routing diode 36 is in reversed relationship to the forward charging direction of capacitor bank 30 so that positive pulses are applied across bank 30, and negative pulses are bypassed around bank 30. Another pulse routing diode 38 is shunt connected across capacitor bank 34 with corresponding relative polarity to apply negative pulses across bank 34. In addition to routing the positive and negative pulses to the desired capacitor banks, the arrangement of pulse steering diodes serves to prevent application of reverse potentials across the polarized capacitors during circuit operation, and thereby protect them against damage. A discharge current limiting resistor 40 is connected in series with a D.C. input winding 42 of a magnetic modulator 44, and together connected between circuit point 26 and ground return 32. The charging time constant for charging capacitor bank 30 is equal to the product of the capacitances thereof and the parallel sum of resistors 20 and 40, and similarly the time constant for charging capacitor bank 34 is equal to the product of its capacitance and the parallel sum of resistors 24 and 40. These capacitances and resistances are of sufficient magnitude that the time constant for charging each capacitor bank is sufficiently long relative to the pulse interval, that pulse integration of positive pulse takes place across capacitor bank 30 and pulse integration of negative pulses takes place across capacitor bank 34. Capacitor bank 30, capacitor bank 34, resistor 40, and winding 42 form a series circuit loop in which the charge polarities on the polarized capacitors are in a series opposition or "bucking" relationship.

As the result of the isolation from source 10 during the interval between pulses, provided by diodes 18 and 22, resistor 40 and winding 42 form the sole load for the series opposed charge potentials in the circuit loop. Thus while the charge time for each capacitor bank was equal to the product of the capacitance and the parallel sum of the appropriate one of charge current limiting resistors 20, 24 and resistor 40, the discharge time constant is dependent solely on the magnitude of resistor 40. As will be apparent, the effective capacitance for the discharge time is the series sum of capacitances of the individual banks and therefore is less than the capacitance of either one of banks. Resistor 40 is of sufficient magnitude that the charge added by each pulse only partially decays during the period between pulses.

Magnetic modulator 44 also comprises an excitation winding 46 and an A.C. output winding 48, all inductively coupled, as symbolically shown by a flux link 50 through the windings. An alternating voltage from a suitable reference source having a sine wave output is applied to excitation winding 46. Operation of magnetic modulator and amplifier 44 will be readily understood by reference to FIG. 2, in which line 51 passes through a plot of values of D.C. input currents through winding 42, and the corresponding values of A.C. output signals induced in winding 48. The A.C. excitation voltage applied to winding 46 is effectively a carrier signal and the D.C. current through winding 42 the modulating signal, producing at winding 48, a signal of reversible phase and variable magnitude which is either in phase, or 180° out of phase with the reference voltage in accordance with the direction of D.C. current flow through input winding 42.

It is highly desirable for the satisfactory operation of the circuit that magnetic modulator 44 have low output harmonic distortion, and low transfer phase shift. A modulator that provided excellent results in an operational embodiment of FIG. 1 with 26 volt R.M.S. excitation voltage of 2000 c.p.s. has the following characteristics:

| Input Currents Milli-Amps | Output Volts, R.M.S. ±10% | Max. Harmonic Distortion, percent | Max. Phase Shift, degrees |
|---|---|---|---|
| 0.002 | 0.075 | 33 | |
| 0.006 | 0.2 | 33 | |
| 0.03 | 1.0 | 14 | ±15 |
| 0.06 | 2.0 | 7 | ±8 |
| 0.10 | 3.0 | 5 | ±5.5 |
| 0.14 | 5.0 | 2½ | ±5.0 |

The details of construction of magnetic modulator capable of meeting such specifications are generally proprietary to the individual manufacturer. Exemplary suitable magnetic modulators which are commercially available include type IMM 519–1, manufactured by General Magnetic, Inc., 135 Bloomfield Avenue, Bloomfield, New Jersey, and type AS–6, manufactured by General Magnetic Corp., 702 South Arroyo Parkway, Pasadena, California.

In describing the operation of the circuit 16, reference is made to FIG. 3 which shows a series of waveforms. Waveform $POS_{in}$ appears at output 12 of pulse source 10; waveform $NEG_{in}$ at output 14 of pulse source 10; and $V_{cap}$ is the charge potential across the series connected capacitor banks 30 and 34. $SIG_{out}$ is a series of highly exaggerated sine wave segments illustrating the A.C. signals and their phase condition appearing at output winding 48 at times generally corresponding to the time scales of waveforms $POS_{in}$, $NEG_{in}$ and $V_{cap}$.

A better understanding of the invention may be had from a study of the operation of circuit 16 in response to several positive and negative input pulses. It is to be assumed that capacitor banks 30 and 34 initially have equal charges so that $V_{cap}$ and $SIG_{out}$ are zero. When a positive pulse 60 appears along waveform $POS_{in}$, a charging current flows through diode 18 and resistor 20 into capacitor bank 30, and returns through diode 38 and ground return 32, causing $V_{cap}$ to become more positive.

As potential $V_{cap}$ builds up it will generate a corresponding current flow through resistor 40 and winding 42. For the duration of pulse 60 the current through resistor 40 and winding 42 is returned to the pulse source through ground return 32. At the termination of pulse 60, diode 18 returns to its normally back-biased condition and $V_{cap}$ continues to generate current flow through winding 42, which instead of flowing through ground return 32, now flows into capacitor bank 34, tending to equalize charges of banks 30 and 34. Since the time constant of the discharge circuit is substantially greater than the time constant of the charge circuit, only a partial decay of the charge added to bank 30 by pulse 60 will occur and therefore pulse 60 results in an essentially stepped increase in $V_{cap}$, and in turn a stepped increase in $SIG_{out}$. A succeeding positive pulse 62 generates a similar stepped voltage increase. Then at some later time, when for convenience $V_{cap}$ is assumed to be one step level above zero, a negative pulse 64 appears along waveform $NEG_{in}$. Pulse 64 generates charge current which flows through diode 22 and resistor 24 into capacitor bank 34 as charge of opposite polarity to the charge accumulated by bank 30, such charges being opposed only in so far as winding 42 is concerned. $V_{cap}$ which is the net voltage across banks 30 and 34 decreases to zero. A succeeding negative pulse 66 generates a net negative charge across banks 30 and 34 with the result that $V_{cap}$ is stepped to a negative value and $SIG_{out}$ is stepped to a voltage with a 180° out of phase condition.

While the described circuit is adequate for many uses, it does have some limitations. In general circuit 16 will not function to integrate unless the drive pulses from pulse source 10 are larger in potential than the sum of the then existing capacitance charge and the forward drop of the two diodes in the charging path. Preferably, the pulse amplitude should be substantially larger than the aforementioned sum.

$SIG_{out}$, the stepped A.C. signal proportional to the integral of the input pulse, is fed to a closed-loop power drive, or servo 64 for positioning a load 66 in accordance with the value of the integral of the input pulses. Servo 64 comprises a summer 68 having input 70 to which $SIG_{out}$ is applied through a scaling resistor 72. An instrument 74 for generating an electrical signal that is a measure of the actual position of load 66 is mechanically coupled to the load by a suitable link, symbolically shown by arrow 76. The measuring instrument 74 may be of any well known type having an excitation input 78, which is connected to the same A.C. reference source that was applied to excitation winding 46 of circuit 16 and which produces, at its output terminals 80, an A.C. phase reversible signal that is a measure of actual position of the load. The output signal from terminals 80 is also applied to input 70 of summer 68, through a scaling resistor 82. Summer 68 algebraically adds the instantaneous values of A.C. input signals applied to input 70, which since both the inputs are relative to the same reference voltage, produce a phase reversible signal having a phase depending on whether the value of the sum is positive or negative and a magnitude in accordance with the value of the sum. The output of the summer is in turn applied through amplifiers (not shown) to a servo actuator 84, of any suitable type, to selectively move the load in either of opposite directions depending on the phase of the signal applied to the servo actuator. In the conventional manner of operation of load positioning servo mechanisms, $SIG_{out}$ is an electrical order signal to selectively control the mechanical movement imparted to the load by servo actuator 84 maintaining the load at desired preselected positions in response to various values of the order signal. $SIG_{out}$ and the signal from instrument 74 are adapted to be of negative phase relationship, which may otherwise be defined as 180° out of phase when the load position corresponds to the position called for by $SIG_{out}$. Depending on the particular apparatus used, this relationship may be achieved by a suitable inversion of the phase of one or the other signals of $SIG_{out}$ or the signal from instrument 74 prior to application to input 70. Since $SIG_{out}$ and the signals from instrument 74 are of negative phase relationship, the output of summer 68 has a phase depending on the sense of direction of actual position of the load relative to the position called for by $SIG_{out}$, and a magnitude in accordance with the distance between the actual and called for position. The relative sense of direction of movement imparted to load 66 by actuator 84 in response to one or the other of opposite phases is so chosen that the load will be moved in a direction reducing the difference, which in turn decreases the amplitude of the signal out of summer 68, until the actual and preselected load positions match.

FIG. 4, in which similar reference characters have been employed to designate corresponding components, shows a specific use of circuit 16 in a depth steering control channel of an acoustic homing torpedo 86. Torpedo 86 contains a pulsed output echo ranging signal system 88 and an associated transducer 90. The signal at the output of system 88 is a periodic pulse signal with each pulse either of positive or negative polarity depending upon the angular direction of relative elevation angle A, of a target T relative to the torpedo axis B. The positive and negative pulses, respectively, appear at separate output channels of signal system 88 and are applied to circuit 16. As hereinabove described, the signal produced at output terminals of circuit 16 is stepped in response to each input pulse and has an amplitude and phase corresponding to the magnitude and sense of the cumulative summation of the pulses. The output of circuit 16 is applied to the input terminals 92 of a summer 94 through a scaling resistor 96. Mechanically coupled to the torpedo body is a pitch measuring instrument 98 for measuring the absolute angle of pitch of the torpedo, and for producing an A.C. signal in accordance with such angle. Pitch instrument 98 may be of any well known type having excitation input terminals 100, which are connected to the same A.C. reference source that is applied to terminals 46 in circuit 16. The output of instrument 98, which appears at output terminals 102 is an A.C. signal having an amplitude and phase corresponding to the magnitude and sense of absolute pitch angle of torpedo 86, otherwise defined as the pitch angle relative to a horizontal reference attitude. The output signal from terminals 102 of pitch instrument 98 is also applied to input terminals 92 of the summer through an associated scaling resistor 104. Summer 94 provides at its output an A.C. signal having an amplitude and phase in accordance with the algebraic sum of the signals from circuit 16 and from pitch instrument 98. The output of summer 94 is applied through amplifiers (not shown) to a servo actuator 106 having excitation input terminals 108 which are connected to the A.C. reference source. Servo actuator 106 operates under the control of the output of summer 94 to selectively move depth steering control surfaces 110 from either of opposite directions of movement depending upon the phase of the signal from summer 94. The signal output of circuit 16 corresponding to a sense of the integral of pulses produced under conditions of a given angular direction of target T, and the signal output of pitch measuring instrument for a sense of pitch angle which would tend to steer the torpedo to reduce the relative angle of the target, are adapted to be 180° out of phase, or of negative phase relationship. Also, the magnitudes of resistance of scaling resistors 96 and 104 are so proportioned to provide a predetermined relationship between the absolute magnitude of pitch angle relative to the horizontal that produces a given signal amplitude, and the value of the signal produced by circuit 16. In the conventional manner of servo operation, the signal from circuit 16 is an electrical order signal to selectively move control surface 90 to maintain the torpedo at a desired preselected pitch angle in response to various values of the order signal and the output of summer 94 will be a measure of any difference between the actual pitch angle of the torpedo and the pitch angle called for by the value of signal from circuit 16 with the phase of the output of summer 94 indicative of angular direction of the actual pitch angle from the angle called for. Servo actuator 106 is adapted to be responsive to the phase of the signal from summer 94 to selectively move the steering control surface in the appropriate direction that will reduce the difference between the actual pitch angle and the pitch angle called for by the signal from circuit 16.

It will be apparent that an integrator and D.C. to A.C. converter circuit has been described which achieves pulse integration at very low pulse repetition frequencies and provides an output signal having an essentially pure and phase significant sine waveform. This is accomplished in part by the construction allowing the charge decay time to be substantially greater than the charge build up time, which in turn is only possible because the discharge circuit is isolated from source 10 during the intervals between pulses. This isolation allows the discharge time constant, determined by the value of resistor 40, to be selectively pre-adjusted independent of the source impedance. The described construction and arrangement achieves a high degree of compactness while permitting values of capacitance which are large enough to achieve the desired decay times by the use of compact polarized capacitors. For example, a highly successful embodiment with capacitor banks 30, 34 constructed from tantalum type capacitors, and with each bank consisting of four capacitors and having a total bank capacitance of 1300 mfd. was assembled as a standard plug-in type 3" x 5" x ¾" circuit with printed conductor.

If desired, the newer compact non-polarized capacitors could be employed in circuit 16 in place of the banks of polarized capacitors. In such instance the pulse routing diodes 36 and 38 would not be needed.

While it will be understood that the circuit specification will vary according to any design consideration, the following list of components is included by way of example only for the circuit 16 of FIG. 1, with periodic input pulses of a width of 400 milliseconds and a pulse recurrence frequency in the order of 40 pulses per minute.

Magnetic modulator 44:
    Line voltage _____ 26 v.
    Line frequency _____ 2000 c.p.s.
    Load impedance _____ 10K resistive.
    Bandwidth _____ 5 c.p.s.
Capacitor banks 30, 34 _____ 1300 mfd., each.
Resistor 40 _____ 18K.
Resistor 20 _____ 5K.
Resistor 24 _____ 8K.
Diodes 18, 22, 30, 38 _____ Silicon type IN482.

Obviously many modifications and variations of the present invention are possible in the light of the above teachings. For example, while circuit 16 has been described and disclosed in connection with a closed loop, feedback control system, it will be apparent that it may also be employed in connection with instrument circuits and analogue computer circuits. It is therefore to be understood that within the scope of the appended claims the invention may be practiced otherwise than as specifically described.

What is claimed is:

1. A pulse integrator and D.C. to A.C. signal converter circuit, comprising;
    (a) a charge circuit for applying periodic input pulses of either positive or negative polarities as charges of corresponding polarity to a capacitance,
    (b) a magnetic modulator having a control winding and an output winding,
        said modulator being operative to produce an A.C. phase-reversible signal in said output winding having a phase dependent on direction of current through the control winding and magnitude in accordance with magnitude of current through the control winding,
    (c) a discharge circuit extending through said control winding and connected in shunt across said capacitance,
        said discharge circuit being adapted to be independent of said charging circuit during the interval of time between pulses and to form a load across said capacitance of sufficient time constant that the charge decay time is long relative to said interval,
        said capacitance being sufficient to produce in said output winding a stepped A.C. phase reversible signal having a level substantially in accordance with the summation of the pulses.

2. A circuit in accordance with claim 1, wherein said magnetic modulator has an excitation winding to which an A.C. phase reference signal is applied, said magnetic modulator being so constructed and arranged that the signal produced in the output winding is essentially in either of 0° or 180° phase register with the said phase reference signal.

3. A circuit in accordance with claim 1, said charge circuit including separate inputs for positive and negative pulses, respectively, each separate input including a unidirectional means for isolating the charging circuit from the source of pulses in absence of a pulse.

4. A circuit in accordance with claim 1, said capacitance comprising first and second polarized capacitors in series loop circuit through said discharge circuit with their respective forward charge directions in opposite directions of current flow through said series loop circuit, said charging circuit adapted to apply current pulses of either of opposite directions of flow to the capacitor having the corresponding forward charge direction, whereby the net charge potential across said first and second capacitors varies in accordance with the time integral of the input pulses and the current flow through the discharge circuit tends to divide said net charge equally between the first and second capacitors.

5. A circuit in accordance with claim 4 wherein each of said first and second capacitances is shunted by a unidirectional device poled so as to bypass current pulses of a direction of flow opposite to its forward charge direction, whereby each of said capacitances are protected from damage by inverse potential thereacross.

6. A circuit in accordance with claim 1 wherein said capacitance comprises a non-polarized capacitor.

7. A D.C. pulse input circuit for an A.C. servo of the type including means for generating an A.C. feedback phase signal having a phase and magnitude in accordance with the controlled output of the servo, said input circuit comprising;
    (a) a charge circuit for applying periodic input pulses of either one of positive or negative polarities as charges of corresponding polarities to a capacitance,
    (b) a magnetic modulator having a control winding and an output winding,
    (c) a capacitance discharge circuit extending through said control winding,
        said modulator being operative to produce an A.C. control phase signal in said output winding having a phase and a magnitude in accordance with the direction and magnitude of flow of capacitance discharge current through the control winding, and
        means for summing said control phase signal and said feedback phase signal to produce a servo controlling error signal to step the controlled output of the servo in accordance with the polarity of each pulse.

8. A closed-loop autopilot system for steering a torpedo comprising, in combination;

(a) torpedo course control means adapted to generate a periodic pulse signal for controlling the torpedo course,
   each pulse of said signal having a polarity in accordance with angular direction of desired course change,
(b) a charge circuit for applying said pulse signal as charge to a capacitance,
(c) a magnetic modulator having a control winding and an output winding,
(d) a capacitance discharge circuit extending through said control winding,
   said modulator being operative to produce an A.C. signal in said output winding having phase and magnitude in accordance with direction and magnitude of capacitance discharge current flow through the control winding,
(e) and a torpedo steering servo responsive to the signal produced in said output winding to step the course of the torpedo in response to each pulse.

References Cited by the Examiner
UNITED STATES PATENTS

| | | | |
|---|---|---|---|
| 2,942,258 | 6/60 | Priest | 343—114.5 |
| 2,992,428 | 7/61 | White | 320—1 |
| 3,021,807 | 2/62 | Stedman | 114—23 |
| 3,027,859 | 4/62 | Wiebusch | 114—23 |

BENJAMIN A. BORCHELT, *Primary Examiner.*
SAMUEL FEINBERG, *Examiner.*